(12) United States Patent
Shiotsu (10) Patent No.: US 7,896,500 B2
(45) Date of Patent: Mar. 1, 2011

(54) PROJECTION TYPE IMAGE DISPLAY DEVICE

(75) Inventor: Shinichi Shiotsu, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 802 days.

(21) Appl. No.: 11/589,076

(22) Filed: Oct. 30, 2006

(65) Prior Publication Data

US 2007/0097325 A1     May 3, 2007

(30) Foreign Application Priority Data

Oct. 31, 2005   (JP) .............................. 2005-316044

(51) Int. Cl.
*G03B 21/16* (2006.01)

(52) U.S. Cl. .............................. 353/52; 353/57; 353/60; 353/85; 353/86; 353/87; 353/88; 353/89; 353/90; 353/91; 353/97; 353/98; 353/99; 353/122; 313/113; 313/114; 313/111; 313/110; 362/264; 362/294; 362/345; 362/373

(58) Field of Classification Search .................. 353/85, 353/86, 87, 88, 89, 90, 91, 97, 98, 99, 119, 353/122; 362/264, 345, 294, 373, 318, 227; 313/113

See application file for complete search history.

(56) References Cited

U.S. PATENT DOCUMENTS

| | | | |
|---|---|---|---|
| 5,860,719 A * | 1/1999 | Suzuki et al. ................. | 353/61 |
| 6,118,130 A * | 9/2000 | Barry ..................... | 250/504 R |
| 6,283,614 B1 * | 9/2001 | Okada et al. ................. | 362/294 |
| 6,472,828 B1 * | 10/2002 | Pruett et al. .................. | 315/225 |
| 6,695,461 B2 * | 2/2004 | Ozawa et al. ............... | 362/268 |
| 7,137,708 B2 * | 11/2006 | Gupta ......................... | 353/84 |
| 7,329,011 B2 * | 2/2008 | Kobayashi et al. ............ | 353/99 |
| 2001/0030865 A1 * | 10/2001 | Glowach et al. ............ | 362/294 |

(Continued)

FOREIGN PATENT DOCUMENTS

CN      1261686 A      8/2000

(Continued)

OTHER PUBLICATIONS

Chinese Office Action dated Aug. 22, 2006, issued in corresponding Chinese Patent Application No. 2006101436526.

(Continued)

*Primary Examiner*—Georgia Y Epps
*Assistant Examiner*—Sultan Chowdhury
(74) *Attorney, Agent, or Firm*—Westerman, Hattori, Daniels & Adrian, LLP (57) ABSTRACT

A liquid crystal rear projector device of the present invention includes a lamp unit providing a light source, a cooling fan for cooling the lamp unit, and an optical system for generating color image light with the lamp unit providing a light source, the lamp unit including a light emitting tube providing a light source, and a reflector for reflecting light emitted from the light emitting tube toward the optical system. The reflector has an air introduction hole for introducing air discharged from the cooling fan into the reflector, which is provided near the spherical portion of the light emitting tube, and faces to a vertical top of the spherical portion to blow the air to the top.

2 Claims, 6 Drawing Sheets

U.S. PATENT DOCUMENTS

| | | | | |
|---|---|---|---|---|
| 2002/0024811 A1* | 2/2002 | Horikawa | ................... | 362/264 |
| 2003/0086271 A1* | 5/2003 | Masuoka et al. | ............ | 362/345 |
| 2005/0073841 A1* | 4/2005 | Imamura | ................... | 362/264 |
| 2005/0269925 A1* | 12/2005 | Kobayashi et al. | .......... | 313/113 |
| 2006/0056182 A1* | 3/2006 | Murasugi | ................... | 362/294 |
| 2009/0262313 A1* | 10/2009 | Rehn | ........................... | 353/98 |

FOREIGN PATENT DOCUMENTS

| | | |
|---|---|---|
| JP | 5-144305 A | 6/1993 |
| JP | 5-325902 A | 12/1993 |
| JP | 7-281296 A | 10/1995 |
| JP | 8-262573 A | 10/1996 |
| JP | 10-115873 A | 5/1998 |
| JP | 11-249235 A | 9/1999 |
| JP | 2003-123529 A | 4/2003 |

OTHER PUBLICATIONS

Chinese Office Action May 8, 2009, issued in corresponding Chinese patent application No. 20061014652.6.

Japanese Reasons for Refusal, issued May 26, 2010 for corresponding Japanese Patent Application No. 2005-316044.

\* cited by examiner

PROJECTION TYPE IMAGE DISPLAY DEVICE

The priority application Number 2005-316044 upon which this patent application is based is hereby incorporated by reference.

BACKGROUND OF THE INVENTION

1. Field of the Invention

The present invention relates to a projection type image display device such as a liquid crystal projector adapted to guide light from a light source to an optical system to generate image light for magnification projection on a forward screen.

2. Description of Related Art

Figure 9:
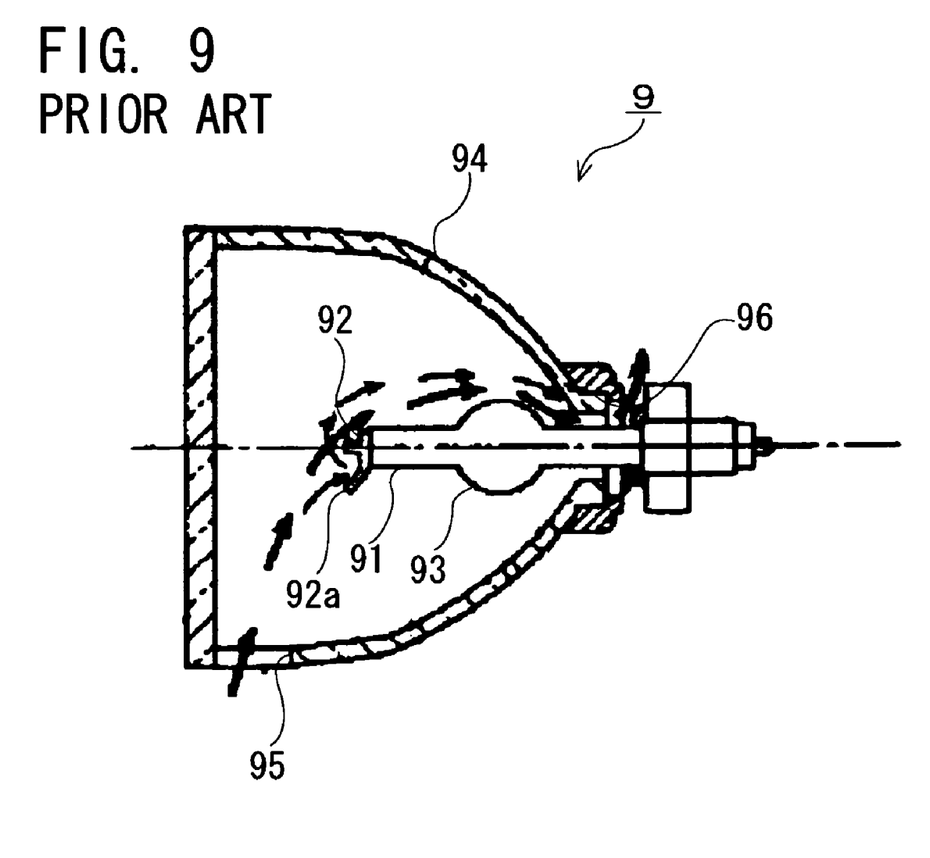
FIG. 9 is a sectional view of a conventional lamp unit.

A conventional liquid crystal projector device includes a casing having disposed therein a light source and an optical system including a polarization beam splitter, a polarizing plate, liquid crystal panels, a projection lens, etc. A discharge emission lamp unit such as a metal halide lamp and an extra high pressure mercury lamp is used as the light source. As shown in FIG. 9, a conventional lamp unit 9 includes a light emitting tube 91 and a reflector 94 for reflecting light emitted from the light emitting tube 91 toward the optical system. The light emitting tube 91 has a spherical portion 93 providing a light emitting portion.

The light emitting tube 91 of the lamp unit 9 shown in FIG. 9 is cooled by a cooling fan because the temperature of the light emitting tube 91 exceeding a limit temperature would shorten the life of the light emitting tube 91. It is known that in light emission of the light emitting tube 91, the temperature at the vertically upper side of the light emitting tube 91 is higher than the temperature at the lower side thereof, which results in the temperature difference between above and below the light emitting tube 91. This temperature difference between above and below is the greatest at the spherical portion 93 of the light emitting tube 91. In order to fully bring out the performance of the light emitting tube 91, it is necessary to maintain the temperature of the light emitting tube 91 below the limit temperature, as well as to cool the light emitting tube 91 such that the temperature difference between above and below is held within a certain range.

Accordingly, the reflector 94 has an air introduction hole 95 for introducing air discharged from the cooling fan into the reflector 94, which is provided forward of a top end 92 of the light emitting tube 91 in an emission direction of light emitted from the lamp unit 9, and faces to the top end 92 of the light emitting tube 91, and also has an air discharge hole 96 for discharging the air introduced from the air introduction hole 95 outside the lamp unit 9, which is provided near a base end of the light emitting tube 91. A tongue 92a projects vertically downward from the top end 92 of the light emitting tube 91.

The tongue 92a blocks air to flow vertically downward of the light emitting tube 91 of the air introduced from the air introduction hole 95. Therefore, the air introduced from the air introduction hole 95 will mostly flow over the vertically upper side of the light emitting tube 91. This prevents the vertically lower side of the light emitting tube 91 from being excessively cooled, while allowing the high-temperature vertically upper side of the light emitting tube 91 to be sufficiently cooled (see JP 2003-123529, A).

In recent years, liquid crystal projector devices have been equipped with a higher-intensity lamp unit in order to satisfy a demand for higher intensity. This has been increasing a heat amount of the light emitting tube. However, the conventional lamp unit 9 shown in FIG. 9 has been suffering from a problem of difficulty in adjusting the air volume and air direction to provide a sufficient cooling effect for the highest-temperature spherical portion 93 of the light emitting tube 91 because the air introduction hole 95 is provided apart from the spherical portion 93 of the light emitting tube 91 to give a complicated airflow from the air introduction hole 95 to the spherical portion 93.

The air introduced from the air introduction hole 95 flows, as indicated by arrows in FIG. 9, through near the top end 92 of the light emitting tube 91 along the vertically upper side of the light emitting tube 91 to the spherical portion 93. Therefore, the air introduced from the air introduction hole 95 will take heat away from the light emitting tube 91 to have a high temperature, so that the high-temperature air will flow around the spherical portion 93 of the light emitting tube 91. This has prevented a sufficient cooling effect for the spherical portion 93, resulting in a problem of difficulty in maintaining the temperature of the spherical portion 93 of the light emitting tube 91 within the limit temperature.

SUMMARY OF THE INVENTION

An object of the present invention is to provide a projection type image display device with a more enhanced cooling effect than the conventional one for the spherical portion of the light emitting tube.

A projection type image display device of the present invention includes a lamp unit 4, a cooling fan 51 for cooling the lamp unit 4, an optical system 2 for generating color image light with the lamp unit 4 providing a light source, and a projection lens 3 for projecting the generated color image light toward a screen. The lamp unit 4 includes a light emitting tube 42 and a reflector 41 for reflecting light emitted from the light emitting tube 42 toward the optical system 2. The light emitting tube 42 has a spherical portion 43 providing a light emitting portion. The reflector 41 has an air introduction hole 44 for introducing air discharged from the cooling fan 51 into the reflector 41. The air introduction hole 44 is provided near the spherical portion 43 of the light emitting tube 42, and faces to a vertical top 43a of the spherical portion 43 to thereby blow the air to the top 43a.

The above projection type image display device of the present invention has a shorter distance between the air introduction hole 44 of the reflector 41 and the spherical portion 43 of the light emitting tube 42 than that of the conventional lamp unit because the air introduction hole 44 is provided near the spherical portion 43 of the light emitting tube 42. This allows the air to reach the top 43a of the spherical portion 43 of the light emitting tube 42 with a higher flow velocity than that in the conventional lamp unit. In addition, the temperature of the air flowing around the spherical portion 43 is lower than that in the conventional lamp unit because the air introduced from the air introduction hole 44 is directly blown to the top 43a of the spherical portion 43 of the light emitting tube 42.

This results in an enhanced cooling effect for the top 43a of the spherical portion 43 of the light emitting tube 42, that is, the highest-temperature portion of the light emitting tube 42. This can prevent the spherical portion of the light emitting tube 42 from having a high temperature exceeding a limit temperature even if the lamp unit 4 used has a high intensity and large heat amount.

In a specific configuration, the reflector 41 has one or more air discharge holes 45 for discharging the air introduced from the air introduction hole 44 outside the lamp unit 4, which are provided at an end forward of a top end 46 of the light emitting tube 42 in an emission direction of light emitted from the lamp unit 4.

In the specific configuration, the air introduced from the air introduction hole 44 will flow along the highest-temperature top 43a of the spherical portion 43 of the light emitting tube 42, and thereafter will flow toward the air discharge holes 45. The air that has passed through the top 43a of the spherical portion 43 of the light emitting tube 42 will flow toward the top end 46 of the light emitting tube 42 because the air discharge holes 45 of the reflector 41 are provided at an end forward of the top end 46 of the light emitting tube 42 in the emission direction of light emitted from the lamp unit 4. This allows the overall light emitting tube 42 to be effectively cooled.

In a specific configuration, the air introduction hole 44 of the reflector 41 is provided in an area where an absolute value of an X-coordinate is not more than a focal length f of the reflector 41, and an absolute value of a Y-coordinate is not more than an outside diameter φ of the spherical portion 43 of the light emitting tube 42 of the lamp unit 4, in a three-dimensional coordinate having an X-axis extending in the light emission direction of the lamp unit 4, a vertically extending Y-axis, and a horizontally extending Z-axis, with an origin being a center of the spherical portion 43.

The inventor prepared a plurality of lamp units 4 with different opening positions of the air introduction hole 44, and conducted an experiment for measuring the temperature at the top 43a of the spherical portion 43 of the light emitting tube 42 of each of the lamp units 4. As a result, it is found that the air introduction hole 44 would provide an enhanced effect of lowering the temperature at the top 43a of the spherical portion 43 of the light emitting tube 42, if provided in the area where in the three-dimensional coordinate the absolute value of an X-coordinate is not more than the focal length f of the reflector 41, and the absolute value of a Y-coordinate is not more than the outside diameter φ of the spherical portion 43.

As described above, the present invention can provide a projection type image display device with a more enhanced cooling effect than the conventional one for the spherical portion of the light emitting tube. Therefore, the temperature of the spherical portion of the light emitting tube can be maintained within the limit temperature even if the lamp unit used has a high intensity and large heat amount.

DETAILED DESCRIPTION OF THE INVENTION

Figure 1:
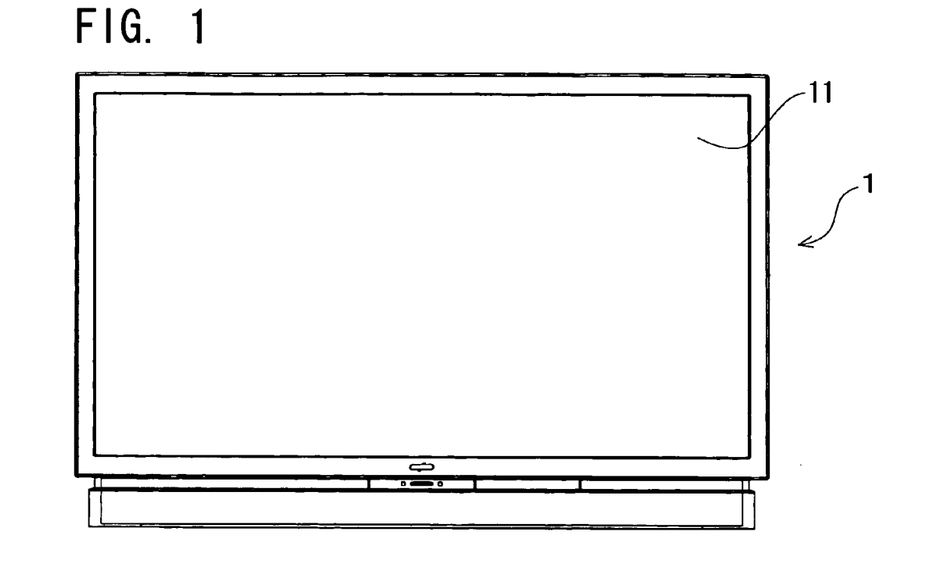
FIG. 1 is a front view of a liquid crystal rear projector device of the present invention.
Figure 2:
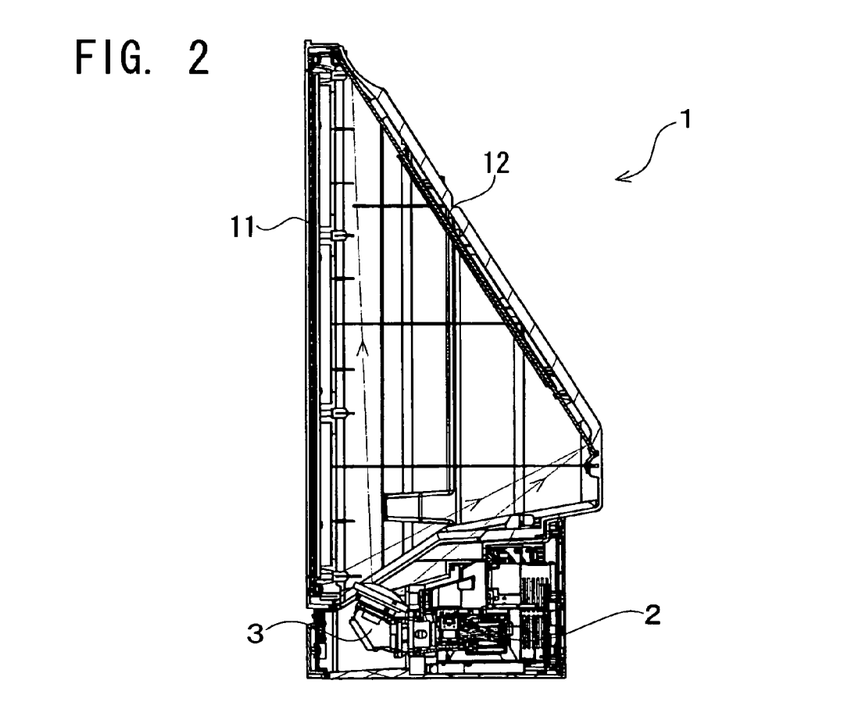
FIG. 2 is a sectional view showing an internal structure of the liquid crystal rear projector device.

The present invention embodied in a liquid crystal rear projector device will be specifically described below with reference to the drawings. As shown in FIG. 1, a liquid crystal rear projector device 1 of the present invention includes a large screen 11 at the front. As shown in FIG. 2, a reflecting mirror 12 is arranged to the rear of the screen 11. Arranged in the lower part of the liquid crystal rear projector device 1 are an optical system 2 for generating color image light with a lamp unit (not shown) described later providing a light source, and a projection lens 3 for projecting the generated color image light toward the reflecting mirror 12.

Figure 3:
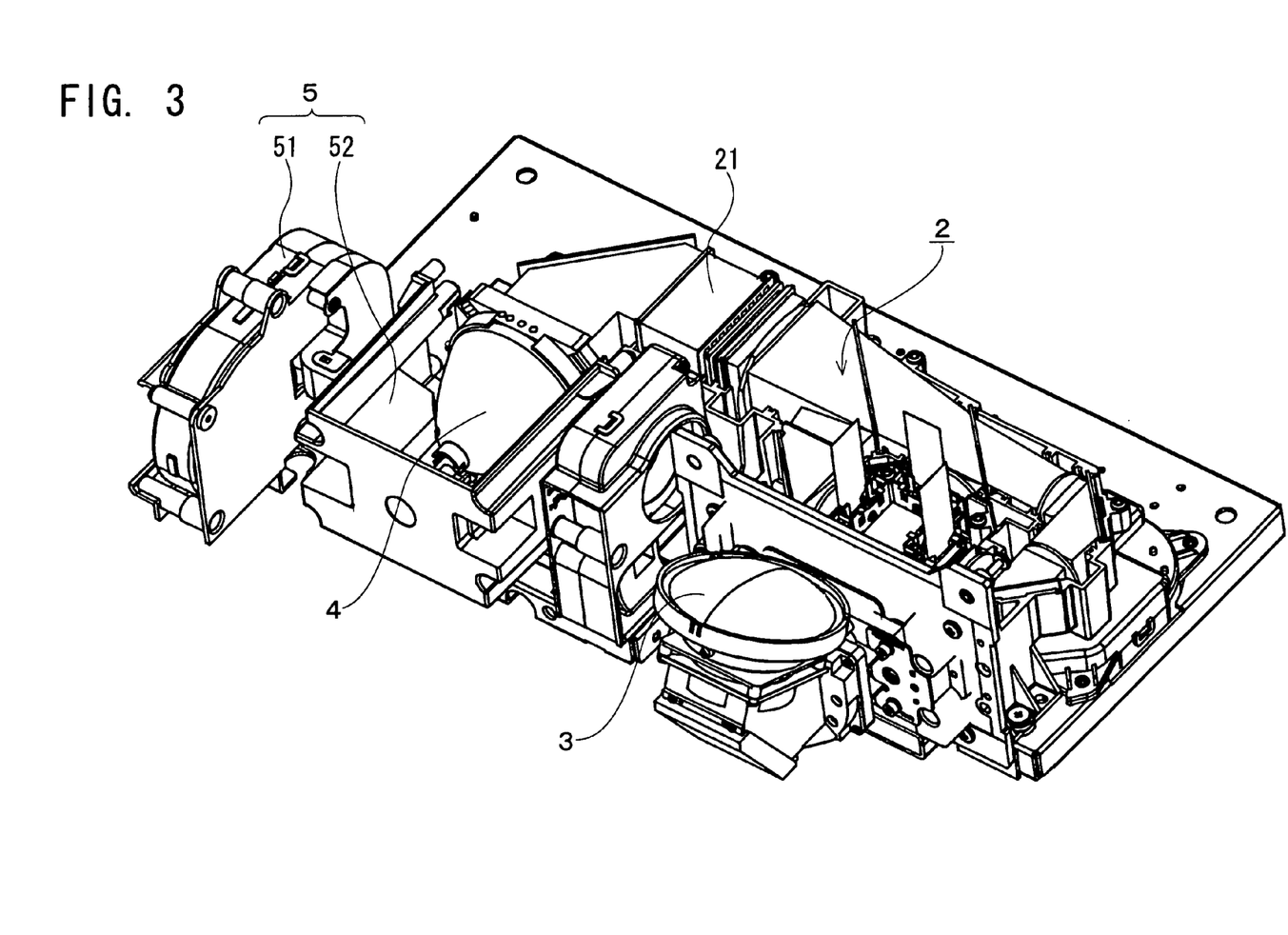
FIG. 3 is a perspective view of an optical system.

As shown in FIG. 3, the optical system 2 is contained in an optical system holding case 21 together with the lamp unit 4 providing a light source. A cooling system 5 for cooling the lamp unit 4 is arranged to the side of the lamp unit 4. The cooling system 5 includes a cooling fan 51 and an air duct 52 constituting a channel for leading air discharged from the cooling fan 51 to the lamp unit 4.

Figure 4:
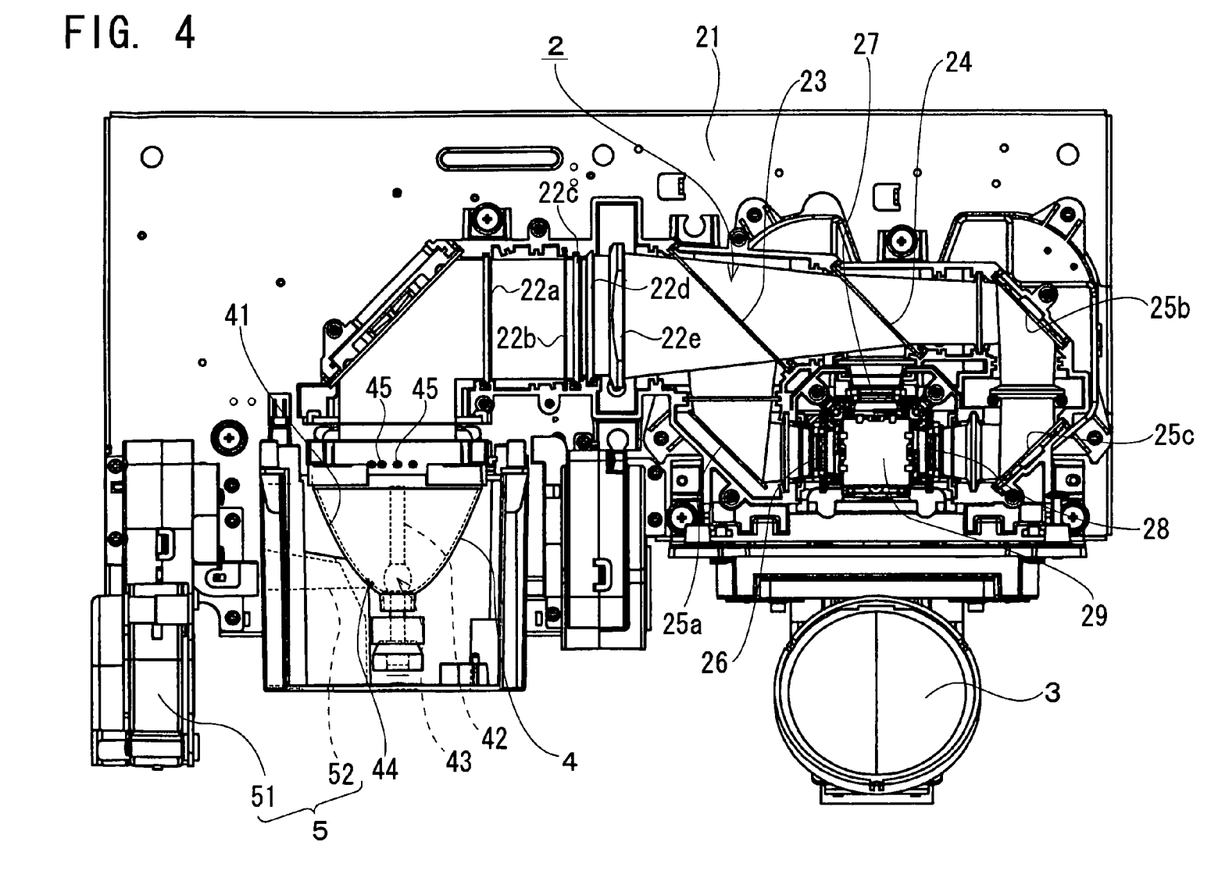
FIG. 4 is a plan view of the optical system.

As shown in FIG. 4, the optical system 2 includes a plurality of optical components 22a-22e including a polarizing element for aligning polarization directions of light emitted from the lamp unit 4. The light that has passed through a field lens 22e at the last stage of the plurality of optical components 22a-22e reaches a first dichroic mirror 23. The first dichroic mirror 23 has a function of reflecting only a blue component of light and passing red and green components therethrough. The blue light reflected by the first dichroic mirror 23 reaches a field mirror 25a, and is reflected by the field mirror 25a and irradiated on a liquid crystal panel for blue 26.

On the other hand, the green light and red light that have passed through the first dichroic mirror 23 reach a second dichroic mirror 24. The second dichroic mirror 24 has a function of reflecting the green component of light and passing the red component therethrough. The green light reflected by the second dichroic mirror 24 is irradiated on a liquid crystal panel for green 27. The red light that has passed through the second dichroic mirror 24 is reflected by a field mirror 25b and a field mirror 25c, and irradiated on a liquid crystal panel for red 28.

The blue light, green light, and red light that have passed through the liquid crystal panel for blue 26, liquid crystal panel for green 27 and liquid crystal panel for red 28, respectively, generate image light of three primary colors. The image light of three primary colors is irradiated on a color synthesis prism 28. The color synthesis prism 28 synthesizes the image light of three primary colors to generate color image light. The color image light is projected from the projection lens 3 toward the reflecting mirror 12 shown in FIG. 2. The color image light reflected by the reflecting mirror 12 is then to be produced on the forward screen 11.

Figure 5:
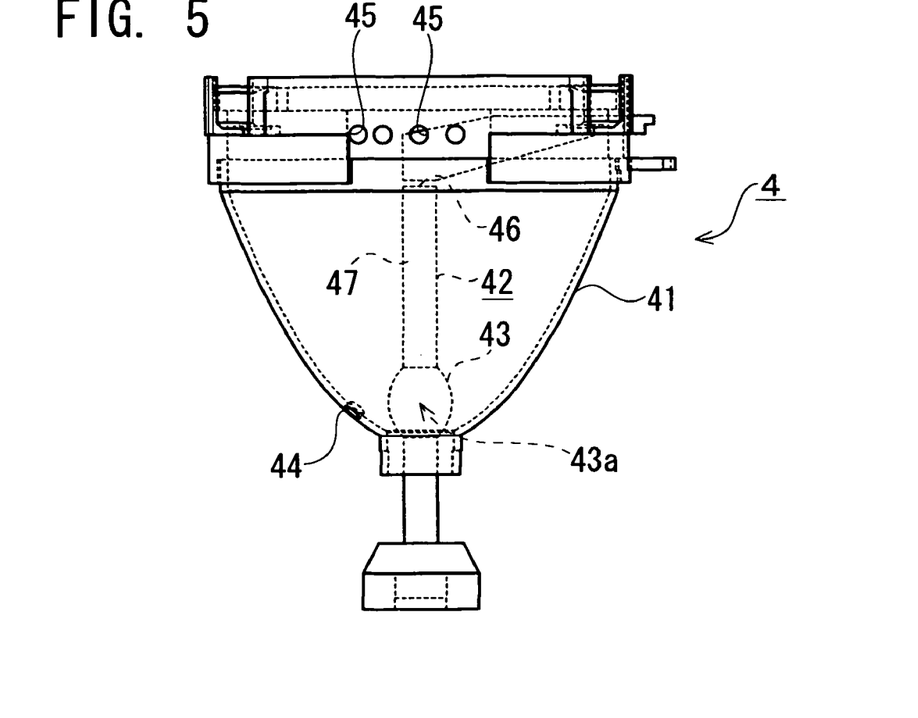
FIG. 5 is a plan view of a lamp unit.
Figure 6:
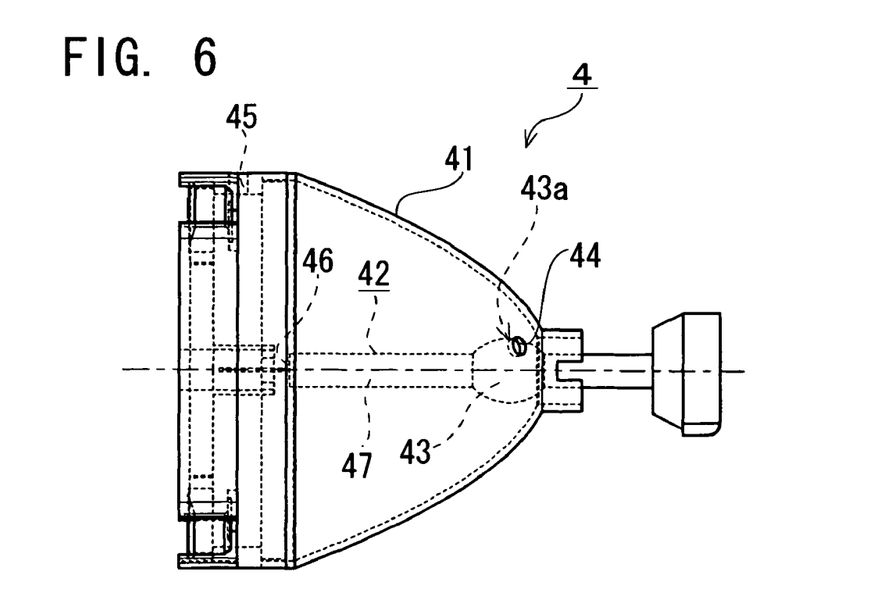
FIG. 6 is a side view of the lamp unit.

As shown in FIG. 5 and FIG. 6, the lamp unit 4 includes a light emitting tube 42 and a reflector 41 having a paraboloidal or ellipsoidal reflecting surface for reflecting light emitted from the light emitting tube 42 toward the optical system 2. The light emitting tube 42 has a spherical portion 43 providing a light emitting portion, and a cylindrical portion 47 extending from the spherical portion 43 in the light emission direction of the lamp unit 4. The spherical portion 43 of the light emitting tube 42 is located at the focal position of the reflecting surface of the reflector 41.

The reflector 41 has an air introduction hole 44 for introducing air discharged through the air duct 52 from the cooling fan 51 of the cooling system 5 shown in FIG. 3 and FIG. 4, which is provided near the spherical portion 43 of the light emitting tube 42, and faces to a vertical top 43a of the spherical portion 43 (see FIG. 5 and FIG. 6). As shown in FIG. 3 and FIG. 4, the air duct 52 of the cooling system 5 extends from the cooling fan 51 toward the air introduction hole 44 of the lamp unit 4.

As shown in FIG. 5 and FIG. 6, the reflector 41 has four air discharge holes 45-45 for discharging the air introduced from the air introduction hole 44 outside the lamp unit 4, which are provided at an end forward of a top end 46 of the light emitting tube 42 in the emission direction of light emitted from the lamp unit 4, and vertically upper than the top end 46.

Figure 7:
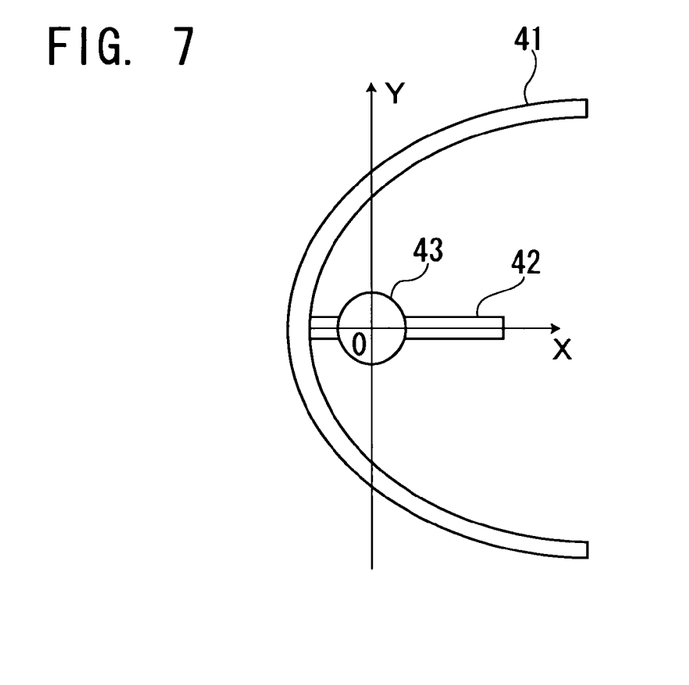
FIG. 7 is a vertical sectional view of a lamp unit used in an experiment.
Figure 8:
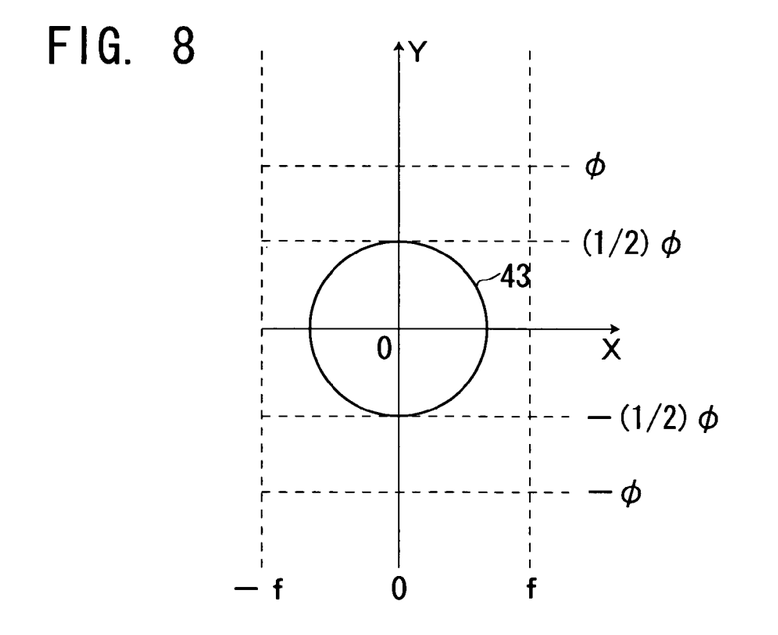
FIG. 8 illustrates an opening position of an air introduction hole of a plurality of lamp units used in the experiment.

The inventor prepared 25 lamp units 4 with different opening positions of the air introduction hole 44, and conducted an experiment for measuring the temperature at the top 43a of the spherical portion 43 of the light emitting tube 42 of each of the lamp units 4 in order to find an opening position of the air introduction hole 44 that allows the highest-temperature top 43a of the spherical portion 43 of the light emitting tube 42 to be effectively cooled. FIG. 7 and FIG. 8 show an XY coordinate system for illustrating the opening position of the air introduction hole 44 of each of the above lamp units 4. As shown in FIG. 7 and FIG. 8, the XY coordinate system has the center of the spherical portion 43 of the light emitting tube 42, that is, the focal position of the reflector 41 defined as the origin, the emission direction of light emitted from the lamp unit 4 as the X-axis direction, and the vertical direction as the Y-axis direction.

The above 25 lamp units 4 were prepared with the opening position of the air introduction hole 44 changed in the X-direction relative to the origin in four steps at an interval corresponding to one-half of the focal length f of the reflector 41 (½f) from (−½f) to (+f) and (+2f), in five steps in total, and with the opening position of the air introduction hole 44 changed in the Y-direction in five steps at an interval corresponding to one-half of the outside diameter φ of the spherical portion 43 of the light emitting tube 42 (½φ) from (−φ) to (+φ). The air introduction hole 44 of all the lamp units 4 had an inside diameter of 3 mm. Table 1 shows the result of measuring the temperature at the top 43a of the spherical portion 43 of the light emitting tube 42 of each of the lamp units 4.

TABLE 1

|  |  | X-direction | | | | |
| --- | --- | --- | --- | --- | --- | --- |
|  |  | −½f | 0 | ½f | f | 2f |
| Y-direction | −φ | 1016° C. | 992° C. | 1032° C. | 1043° C. | 1051° C. |
|  | −½φ | 949° C. | 940° C. | 965° C. | 1021° C. | 1053° C. |
|  | 0 | 924° C. | 912° C. | 925° C. | 988° C. | 1048° C. |
|  | ½φ | 933° C. | 890° C. | 935° C. | 1005° C. | 1049° C. |
|  | φ | 947° C. | 963° C. | 980° C. | 1038° C. | 1053° C. |

As apparent from the measured result, the top 43a of the spherical portion 43 of the light emitting tube 42 has the lowest temperature when the air introduction hole 44 is provided at a coordinate (0, ½φ). As the distance between the air introduction hole 44 and the center of the spherical portion 43 becomes longer, the temperature at the top 43a of the spherical portion 43 of the light emitting tube 42 tends to rise. In the cases where the distance between the air introduction hole 44 and the center of the spherical portion 43 is the same, the air introduction hole 44 provided vertically upper than the center of the spherical portion 43 provides an enhanced temperature lowering effect at the top 43a of the spherical portion 43 of the light emitting tube 42 compared to that provided vertically lower.

Based on the above result, the lamp unit 4 of the liquid crystal rear projector device 1 of the present invention has the air introduction hole 44 provided about a point closer to the cooling system 5 shown in FIG. 3 of two points where a line through the coordinate (0, ½φ) and perpendicular to the X-direction and Y-direction intersects with the reflector 41.

The above liquid crystal rear projector device 1 has the air introduction hole 44 provided at the side of the reflector 41 because the cooling system 5 is arranged to the side of the reflector 41 as shown in FIG. 3. However, the air introduction hole 44 of the reflector 41 may be provided right above the center of the spherical portion 43 of the light emitting tube 42 if the cooling system 5 can be arranged vertically above the lamp unit 4.

The lamp unit 4 of the liquid crystal rear projector device 1 of the present invention has a shorter distance between the air introduction hole 44 of the reflector 41 and the spherical portion 43 of the light emitting tube 42 than that of the conventional lamp unit 9 shown in FIG. 9 because the air introduction hole 44 is provided near the spherical portion 43 of the light emitting tube 42.

This allows the air to reach the top 43a of the spherical portion 43 of the light emitting tube 42 with a higher flow velocity than that in the conventional lamp unit 9, as well as lowering the temperature of the air. This results in an enhanced cooling effect for the highest-temperature portion of the light emitting tube 42. This can prevent the spherical portion 43 of the light emitting tube 42 from having a high temperature exceeding a limit temperature even if the lamp unit 4 used has a high intensity and large heat amount.

The air introduced from the air introduction hole 44 will flow along the highest-temperature top 43a of the spherical portion 43 of the light emitting tube 42, and thereafter will flow toward the plurality of air discharge holes 45-45. The air that has passed through the top 43a of the spherical portion 43 of the light emitting tube 42 will flow along the vertically upper part of the light emitting tube 42 toward the top end 46 of the light emitting tube 42 because the plurality of air discharge holes 45-45 of the reflector 41 are provided at a vertically upper end forward of the top end 46 of the light emitting tube 42 in the light emission direction of the lamp unit 4. This allows the overall vertically upper part of the light emitting tube 42 to be effectively cooled.

The present invention is not limited to the foregoing embodiment in construction but can be modified variously by one skilled in the art without departing from the spirit of the invention as set forth in the appended claims. For example, the present invention may be carried out in DLP (Digital Light Processing) (registered trademark of Texas Instruments (TI) Incorporated) projectors.

What is claimed is:

1. A projection type image display device, comprising:
   a lamp unit;
   a cooling fan for cooling the lamp unit;
   an optical system for generating color image light with the lamp unit providing a light source; and
   a projection lens for projecting the generated color image light toward a screen,
   the lamp unit comprising
      a light emitting tube having a spherical portion providing a light emitting portion; and
      a reflector for reflecting light emitted from the light emitting tube toward the optical system, the reflector having an air introduction hole formed only in the reflector for introducing air discharged from the cooling fan into the reflector, the air introduction hole being formed in a portion of the reflector near the spherical portion of the light emitting tube, and facing a vertical top of the spherical portion to blow the air on the top,
   wherein a center of the spherical portion of the light emitting tube forms an origin of an XYZ coordinate system having a Y-axis extending vertically, an X-axis extending in a light emission direction of the lamp unit and perpendicular to the Y-axis, and a Z-axis extending perpendicularly to both the X-axis and the Y-axis, and
   the air introduction hole of the reflector is provided in an area where a value of an X-coordinate in a direction opposite to the light emitting direction from the origin is not more than one-half the focal length of the reflector, a value of an X-coordinate in a light emission direction from the origin is not more than the focal length of the reflector, and an absolute value of a Y-coordinate is not more than an outside diameter of the spherical portion of the light emitting tube of the lamp unit.

2. The projection type image display device according to claim 1, wherein the reflector has one or more air discharge holes for discharging the air introduced from the air introduction hole outside the lamp unit, which are provided at an end forward of a top end of the light emitting tube in an emission direction of light emitted from the lamp unit.

* * * * *